United States Patent [19]

Chin et al.

[11] 3,997,900
[45] Dec. 14, 1976

[54] FOUR BEAM PRINTED ANTENNA FOR DOPPLER APPLICATION

[75] Inventors: Edward G. H. Chin, Rego Park, N.Y.; Leonard Schwartz, Montville, N.J.

[73] Assignee: The Singer Company, Little Falls, N.J.

[22] Filed: Mar. 12, 1975

[21] Appl. No.: 557,894

[52] U.S. Cl. .................. 343/100 SA; 343/705; 343/854
[51] Int. Cl.² .......................................... H04B 7/00
[58] Field of Search ............ 343/100 SA, 854, 846, 343/705

[56] References Cited
UNITED STATES PATENTS

| | | | |
|---|---|---|---|
| 3,736,592 | 5/1973 | Coleman | 343/854 |
| 3,858,218 | 12/1974 | Masak et al. | 343/854 |
| 3,864,680 | 2/1975 | Hannan | 343/854 |
| 3,911,442 | 10/1975 | Hatch | 343/854 |

Primary Examiner—T.H. Tubbesing
Assistant Examiner—T. M. Blum
Attorney, Agent, or Firm—T. W. Kennedy

[57] ABSTRACT

A novel approach for generating four symmetrically located beams from a printed antenna using a corporate feed system is described. One approach used to generate four low side lobe beams utilizes a planar aperture. The second approach generates four low side lobe beams from a cylindrically shaped aperture. The generation is accomplished without the use of active phase shifting devices. The output phase function of the feed can be reversed which causes the beam to be pointed equally in the opposite direction. The radiating elements are designed to be symmetrical about the center of the aperture in a direction orthogonal to the radiating elements. By placing identical feeds at both ends, four beams can be obtained, each pointed in a direction symmetrically located about the normal to the antenna. Such an approach is applicable to both planar arrays and cylindrically shaped arrays.

8 Claims, 44 Drawing Figures

FIG. 5a — 22.5° SLOPE

FIG. 5b — 67.5° SLOPE

FIG. 5c — 45° SLOPE

FIG. 6
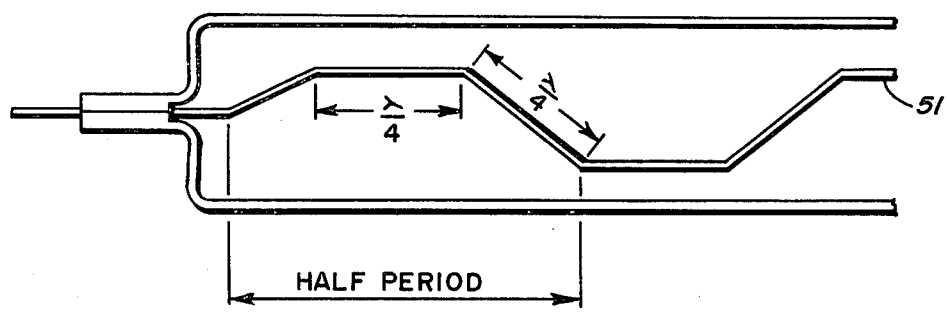
FIG. 7a
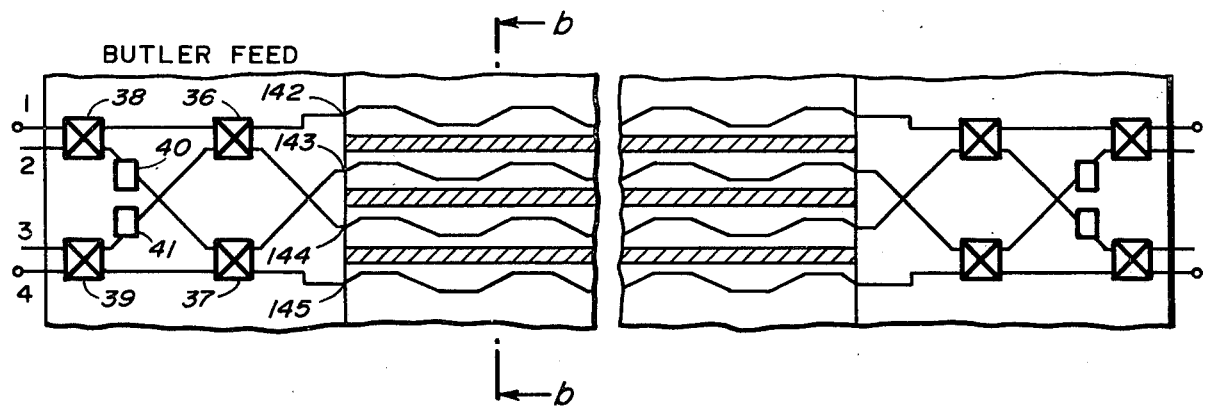
FIG. 7c
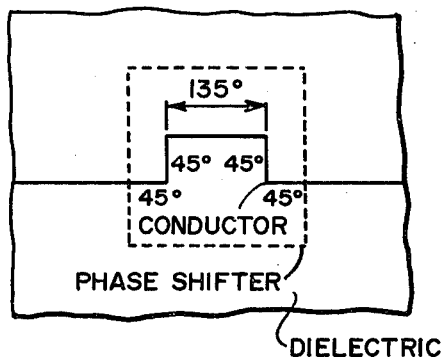
FIG. 7b
FIG. 7d
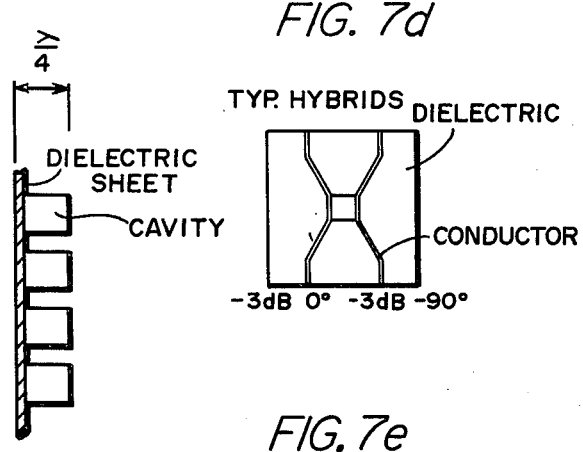
FIG. 7e
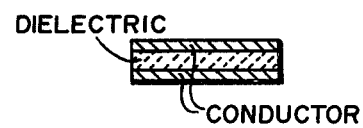

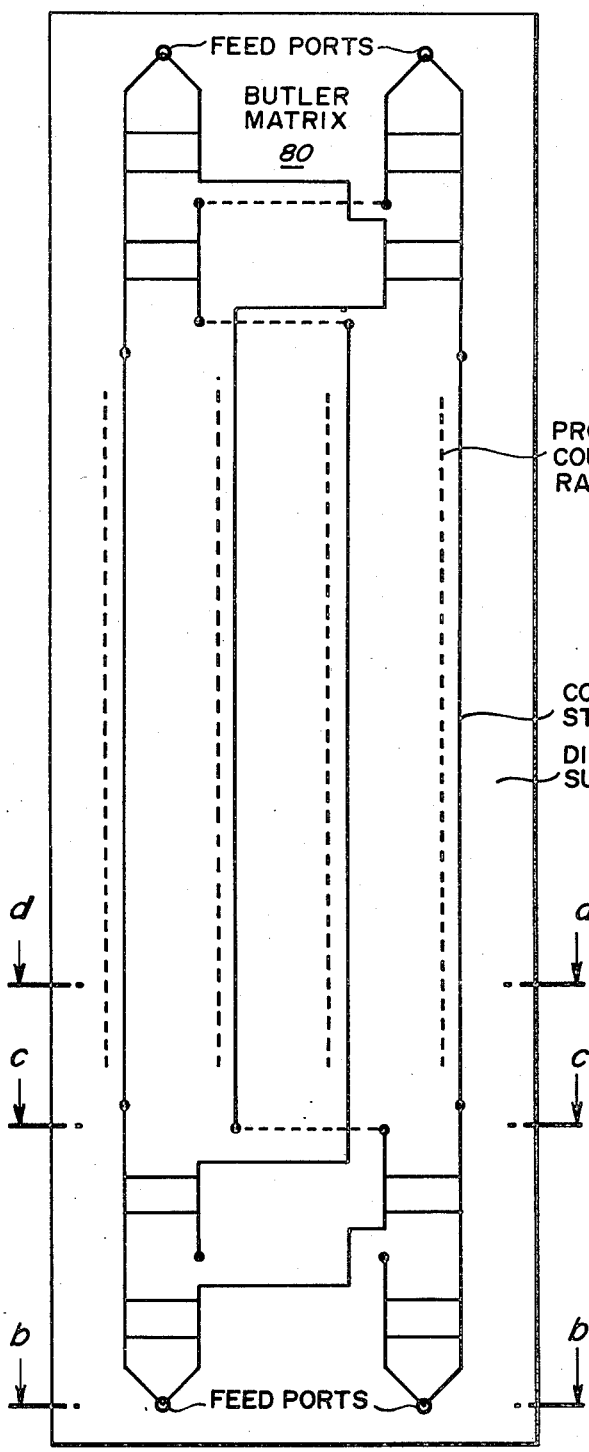
FIG. 10a
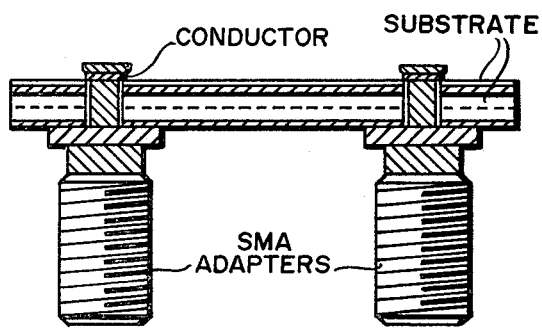
FIG. 10b
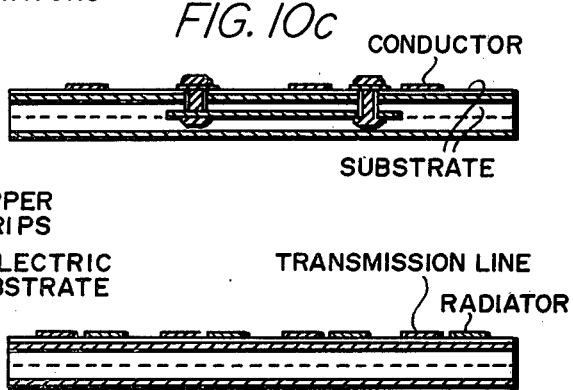
FIG. 10c
FIG. 10d

SCAN = 22.5°

SCAN = 10.0°

SCAN = 0°

SCAN = -10.0°

SCAN = 20.0°

SCAN GEOMETRY

FOUR BEAM PRINTED ANTENNA FOR DOPPLER APPLICATION

BACKGROUND OF THE INVENTION

1. In General

This invention relates to antennas and, in particular, to four beam printed antennas for Doppler applications. Accordingly, it is a general purpose of this invention to provide novel devices of such character.

For a fixed antenna Doppler velocity measuring radar system, the antenna must sequentially generate four independent but symmetrically located pencil beams, each in a different quadrant of the ground. It is also necessary in Doppler radar applications to generate low side lobe, narrow beam width patterns. The latter two requirements generally require that all four beams be radiated from a common aperture in order to more fully utilize the space allocated for the antenna.

The space or volume allocated for the antenna is another very important consideration. In the past, planar antennas were required to be imbedded inside the frame of the aircraft and a conformal radome used to enclose the antenna. The use of a conformal or cylindrical antenna would be most desirable since the overall volume occupied by the Doppler radar antenna can be substantially reduced.

This invention provides a novel approach for generating four symmetrically located pencil beams with low side lobe levels from a common cylindrically shaped photo etched antenna. The approach for generating the four beams, one in each of the four spatial quadrants, is accomplished without the use of active phase shifting devices and withot the use of amplitude controllers. It is believed that this has never been previously accomplished in cylindrical arrays without the use of active phase shifters and amplitude controllers.

Another novel feature for this invention is the thickness of the antenna. This antenna, constructed in accordance with the invention, is very thin and thus can be mounted on the outside of an aircraft. A thick antenna cannot be mounted on the outside surface since severe aerodynamic perturbations would result. However, if the antenna is to be imbedded inside the airframe, a cut-out is required. Any cut-out in the airframe is undesirable since the structural integrity of the frame is compromised. Even is structurally the cut-out is acceptable, it would still be desirable to mount the antenna on the surface for economic considerations.

This invention requires only that a few small holes be made in the airframe. The holes are only required to connect the antenna to the electronic circuitry located inside the aircraft. An illustrative mounting arrangement is shown in FIGS. 19a, 19b, 19c, 19d, and 19e where a cylindrical antenna is shown mounted outside the aircraft and conforming to the aircraft shape.

The concept presented can similarly be used to generate four symmetrically located pencil beams with low side lobes from a planar photo etched antenna. Because the description of the antenna is most efficiently approached by describing the planar configuration, a description of the planar case will procede the description of the cylindrical case.

2. Description of the Prior Art

It is desired to provide novel antenna configurations that can be used for low cost printed, or photo-etched, planar or conformal Doppler applications. The state of the art of antennas has advanced to a degree that printed antennas can be provided in extremely thin shape so that they can be made in conformal shapes to meet the requirements for difficult aircraft installation problems. A printed antenna, such as described in U.S. Pat. No. 3,721,988, is not suitable for four beam conformal applications.

Multi-beam antennas have been successfully built, for example, as set forth in "An RF Multiple Beam-Forming Technique" by William P. Delaney, IRE Transcations on Military Electronics, April, 1962, pages 179 to 186. Delaney describes a sixteen beam antenna.

In order to achieve a low side lobe performance desired for fixed antenna Doppler radar, it is desired that a tapered rather than a uniform illumination be generated by the matrix. It has been shown by R. C. Hansen in "Microwave Scanning Antennas", Volume 111, at pages 263 to 268, that by connecting the beam ports of two adjacent beams of a uniformly illuminated matrix, the resulting amplitude function is a cosine with a tapered side lobe structure with the first side lobe-23 db down from the main beam.

This invention incorporates elements known as Butler matrices. The design on the feed matrix is described in "The Systematic Design of the Butler Matrix" by H. J. Moody, IEEE Transactions on Antennas and Propagations" November 1964, pages 786 to 788.

This invention further utilizes radiators. The strip radiators can include devices known as Microstrip or strip line. Many of these applicable radiators are described in the literature, for example, "The Sandwich Wire Antenna" by W. Rotman and N. Karas, The Micro-Wave Journal, August 1959. Also, see "Recent Developments in the Study of Printed Antennas" by J. A. McDonough, R. G. Malich, and J. Kowalsky, AIL, 1957. Another suitable radiator would be the so-called Collins radiator, described in "A New Flush Mounted Antenna Element for Phased Array Application" By E. V. Byron, *Proceedings of the Phased Array Antenna Symposium*, 1970.

Still another suitable radiator, would be a simple short section of a conductive strip located above a ground plane. Such short open circuit stub radiators are described by L. Lewin in "Radiation From Discontinuities in Strip-line", Proceedings of the IEE (England), 1960.

Additional references on Butler matrices include "Multiple Beams from Linear Arrays," J. P. Shelton, IRE Transactions on Antennas and Propagation, March 1961. See also, "The Design of Hybrid of Multiple Beam Forming Networks" by K. H. Hiring, Proceedings of the 1970 Phased Array Antenna Symposium.

Various references have described basic concepts for scanning a circular array in detail. Such references include "A Matrix-Fed Circular Array for Continuous Scanning" by Boris Sheleg, Proceedings of the IEEE, Volume 56, No. 11, pages 2,016 to 2,127, November 1968; "The Multiple-Beam Cylindrical Array Antenna-Theory" by George Chadwich, Conformal Array Antenna Conference, NELC, San Diego, California, January 13–15, 1970; and "The Multiple-Beam Cylindrical Array Antenna-Practice" by R. Van Wagoner, Conformal Array Antenna Conference, NELC, 1970.

Though the basic concepts for scanning a circular array is discussed in the foregoing three references a less vigorous discussion is given below. The far field radiation pattern for the linear array is given by $$E(\mu) = \sum_{n=-N}^{N} A_n e^{jn\mu} \quad (1)$$

where $$\mu = \frac{2\pi d}{\lambda} \cos \phi$$

The far field radiation pattern for a circular array is given by $$E(\phi) = \sum_{n=-N}^{N} C_n e^{jn\phi} \quad (2)$$

Note that in Equation (1) above, there is a linear phase variation across the element function $A_n$. However, because $C_n$ in equation (2) is a complex function there is no one-to-one correspondence between changes in the current distribution and $C_n$. If the current distribution about the ring were to be represented by a Fourier series, the terms of such series would each represent a current mode of unit amplitude having a linear phase variation with angle. The far field pattern for each mode has the same form as the mode itself. Thus, it is proper to consider these mode patterns to be terms in the Fourier representation of the far field pattern of the original distribution. It then becomes apparent, that by expressing the far field pattern to the sum of the modes, each having a linear phase variation, the analogy to that of a pattern for a linear array is relevant.

Shelton discovered that it is possible to excite these modes simultaneously and independently by using a Butler matrix to feed N elements. See "Multiple Beams from Linear Arrays" by J.P. Shelton, IRE Transactions on Antennas and Propagation, March 1961, pages 154 to 161.

SUMMARY OF THE INVENTION

It is an object of this invention to provide novel, low-cost antennas for generating four symmetrically located beams about a planar or conformal substrate.

Another object of this invention is to provide novel, low-cost all printed planar or conformal antenna arrays for use in Doppler applications.

In accordance with a preferred embodiment of this invention, a printed antenna for generating four symmetrically located beams includes a pair of Butler matrices and a plurality of strip radiators coupled to the Butler matrices. Preferably, the antenna is photoetched, and, in a particular configuration, the antenna includes a planar substrate wherein the Butler matrices and the strip radiators are fixed to the planar substrate.

In accordance with another embodiment of the invention, a cylindrically shaped printed antenna array for generating four beams symmetrically about its transverse axis, includes a plurality of radiators disposed about a cylindrical locus. A first Butler matrix means has inputs adapted to be coupled to a suitable radar circuitry. The first Butler matrix is useful for switch scanning the radiators. A plurality of fixed phase shifters are coupled to the output of the first Butler matrix. The phase shifters focus a beam in one of a plurality of scan positions. A second Butler matrix has its inputs coupled to the phase shifters and has its outputs coupled to the radiators. The second Butler matrix acts as a mode generating matrix. Thus, by alternately exciting or switching the inputs of the first Butler matrix, a beam can be scanned by the radiators. Similarly, two additional Butler matrices are connected to the other end of the radiating elements thus providing the third and fourth beams.

BRIEF DESCRIPTION OF THE DRAWINGS

Other objects, advantages, and features of this invention will become more apparent from a reading of the following specification, when read in conjunction with the accompanying drawings, in which:

FIGS. 5a, 5b, and 5c are normalized plots of phase distribution, corresponding to excitation of various input ports of the embodiment depicted in the diagram of FIG. 4;

FIG. 6 is an illustration of a sandwich wire radiator;

FIG. 7a is an illustration depicting a printed sandwich wire radiator, suitable for use in an embodiment of this invention;

FIG. 7b is a view taken along the line b—b of FIG. 7a;

FIG. 7c is a mechanical view of a phase shifter 40, 41 shown in block diagram in FIG. 7a;

FIG. 7d is a mechanical view of a typical hybrid shown in block diagram in FIG. 7a;

FIG. 7e is a sectional diagram of both the phase shifter and typical hybrid shown in FIGS. 7c and 7d;

FIG. 8b is a sectional view taken along the lines b—b of FIG. 8a;

FIG. 8c is a sectional view taken along the lines c—c of FIG. 8a;

FIGS. 9b and 9c are sectional views taken along the lines b—b and c—c, respectively, of FIG. 9a;

FIG. 10a is an illustration of the preferred embodiment for the planar array configuration of this invention;

FIGS. 10b, 10c, and 10d are sectional views taken along the line b—b, c—c, and d—d, respectively, of FIG. 10a;

DETAILED DESCRIPTION

An embodiment suitable for use on a planar substrate or on conformal substrates for Doppler applications will now be described.

The type of printed antenna described herein can employ either strip line or Microstrip exclusively, so that both the feed system and the radiating system of a Doppler radar apparatus can be photo-etched. A completely photo-etched antenna results in lower costs than designs which employ slotted wave guide feeds and reflector plates, which prior art devices require machining in addition to printed radiating surfaces.

Figure 1:
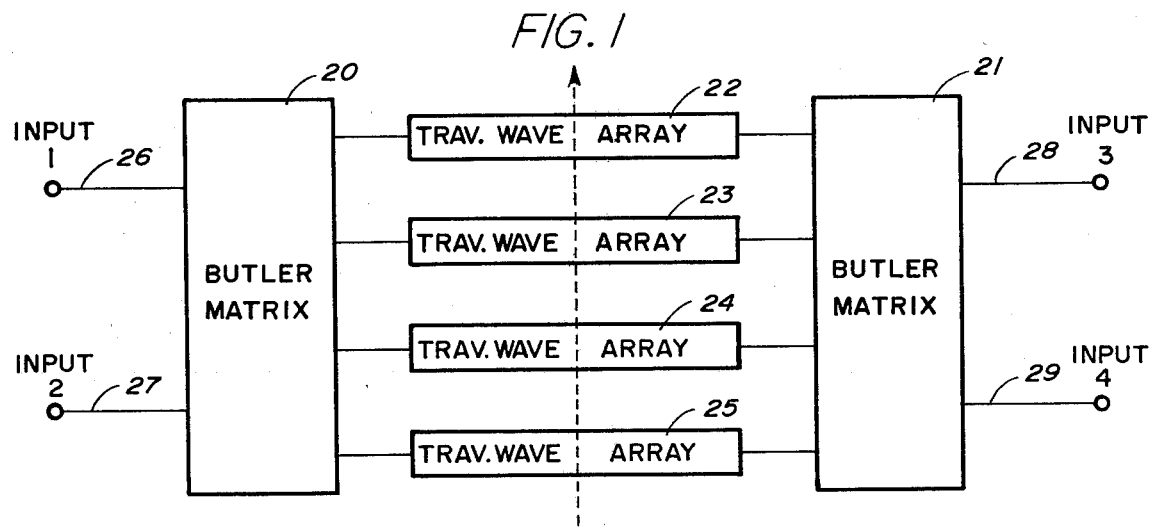
FIG. 1 is a block diagram of a planar printed four beam antenna, suitable for Doppler radar, in accordance with one embodiment of this invention.

Referring to FIG. 1, there is shown a block diagram of a planar printed four beam antenna suitable for Doppler radar. The antenna configuration consists of two Butler matrices 20, 21, the outputs of which feed each end of traveling wave linear arrays 22, 23, 24, and 25. Each Butler matrix 20, 21 has two independent feed ports 26, 27, and 28, 29, respectively. Each port 26, 27, 28, and 29 is capable of producing a single beam in a single direction. When one feed port, 26 for example, of a Butler matrix, such as 20, is excited and the other ports 27, 28, 29 of both matrices 20, 21 are terminated, a single beam results. By use of a PIN diode switch system, it is possible to obtain the four time shared beams required or a Doppler radar.

The beams are produced in a direction lying in a plane perpendicular to the plane of the paper, as indicated generally in a dotted line arrow shown at FIG. 1.

Figures 2A, 2B:
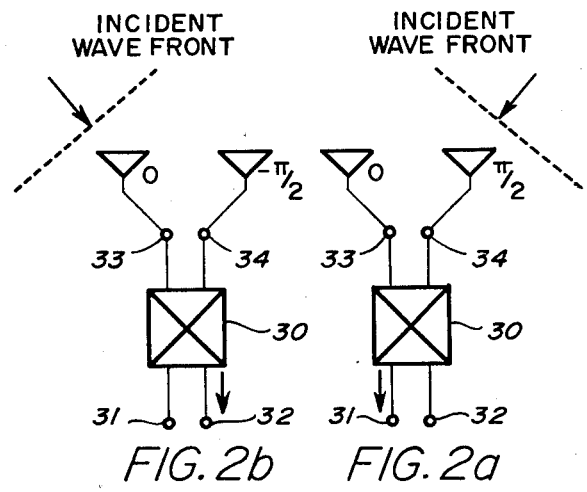
FIGS. 2a and 2b are diagrams of a 3db hybrid and a pair of radiating elements, useful for an understanding of this invention.

A parallel feed system for a linear array can be provided utilizing fixed phase shifters and 3 db hybrid couplers which are capable of producing multiple overlapping beams. Each beam generating port is thus available as a separate isolated terminal. The basic principle involved in the multiple beam formation process can be understood by reference to the simplest configuration, a two element two beam matrix shown in FIGS. 2a and 2b. The dual beam system consists of a 3 db hybrid and two radiation elements. The 3 db hybrid 30, as shown in FIGS. 2a and 2b, is a four port device having terminals 31, 32, 33, and 34 that produce a quadrature relationship between the two output ports when fed from one of the input ports. The input ports are isolated from each other. Thus, a received signal with a wave front which produces a 0 and $\pi/2$, relative phase, between terminals 33 and 34, as shown in FIG. 2a, produces an output at the terminal 31. Similarly, a beam with a wave front which produced a 0 and $-\pi/2$, relative phase between the terminals 33 and 34 produces an output at the terminal 32, as shown in FIG. 2b. The two beam ports 31, 32 have an isolation depending upon the basic hybrid isolation and the impedance match at the ports 33 and 34. Typical values of isolation over moderate bandwidths are 25 db.

Figure 3:
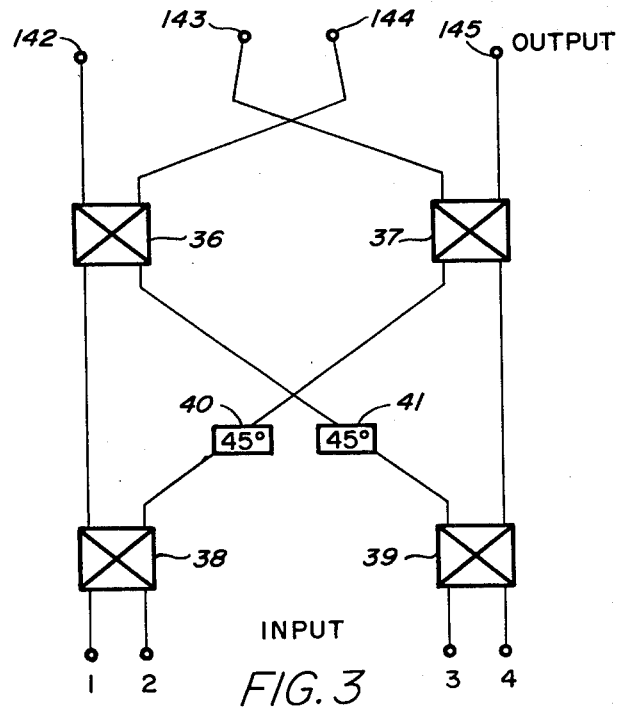
FIG. 3 is a block diagram of a four beam matrix useful for an understanding of this invention.

The basic two elements two beam matrix can be used as a building block to achieve a larger number of overlapping beams. For example, a four beam matrix can be built of interlacing two two element beam matrices, and then providing a second level of direction couplers to combine the outputs. The fixed phase shifters are inserted between the first and second level of couplers to obtain the correct phase progression required for the four beams. Hence, referring to FIG. 3, there is shown a four beam matrix including 3 db hybrids 36, 37, 38, and 39. Inputs 1 and 2 are fed to the 3 db hybrid 38 and inputs 3 and 4 are fed into the 3 db hybrid 39. One output of the 3 db hybrid 38 is fed to one input of the 3 db hybrid 36. The second output of the 3 db hybrid 38 is coupled through a 45° fixed phase shifter 40 to a first input of the 3 db hybrid 37. The first output of the 3 db hybrid 39 is coupled through a 45° fixed phase shifter 41 to a second input of the 3db hybrid 36, while a second output of the 3db hybrid 39 is coupled to a second input of the 3db hybrid 37. The first output of the 3db hybrid 36 is coupled to a first output terminal 142. A first output of the 3db hybrid 37 is coupled to a second output terminal 143. A second output of the 3db hybrid 36 is coupled to a third output terminal 144 and a second output of the 3db hybrid 37 is coupled to a fourth output terminal 145. The basic building block process can be repeated to obtain any binary numbers of output beams. For example, a sixteen beam matrix can be considered as four interlaced four beam matrices with additional couplers and fixed phase shifters.

The multi-beam phased matrices described herein are capable of producing a set of uniformly illuminated amplitude functions with different linear phase tapers.

In order to achieve a low side lobe performance, desired for fixed antenna Doppler radar, it is desired that a tapered rather than uniform illumination be generated by the matrix. It has been shown in the prior art as set forth in "Micro-wave Scanning Antennas" by R. C. Hansen, as set forth above, that by connecting the beam ports of two adjacent beams of a uniformly illuminated matrix, the resulting amplitude function is cosine with a tapered side lobe structure with the first side lobe-23db down from the main beam. The resulting beam pointing direction for the low side lobe beam is half-way between the two uniformly illuminated beams. Thus, for Doppler application, only four beam ports of a multiple beam matrix is utilized. Two ports can be inter-connected providing a beam approximately fifteen degrees from the array broad side direction. The two isolated feed ports can provide low side lobe beams at either plus or minus, 15° from the broadside direction.

A more detailed explanation of the foregoing is given below.

A FOUR BEAM PLANAR ARRAY CONFIGURATION

Figure 4:
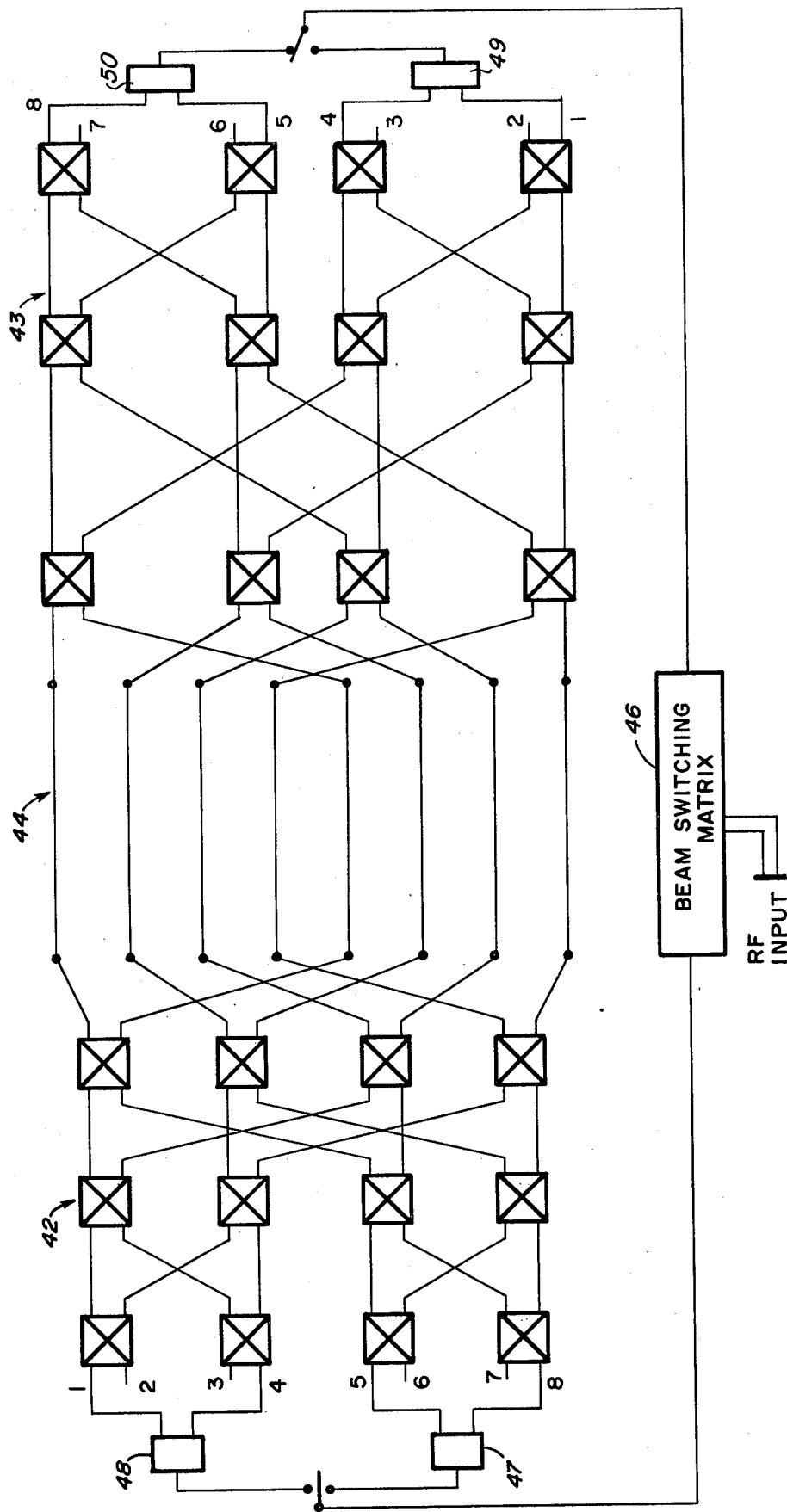
FIG. 4 is a schematic diagram of a 4-beam planar printed antenna in accordance with an embodiment of this invention.

Referring to FIG. 4, there is shown a schematic diagram utilizing two eight element Butler matrices 42, 43. The design for a feed matrix is well-known in the art, as set forth for example in "The Systematic Design of the Butler Matrix" by H. J. Moody, such reference being cited hereinabove. Table I shows the output phases of the elements corresponding to the excitation of each of the input ports. The radiating elements have not been specified and are discussed hereinafter. FIGS. 5a, 5b, and 5c are plots of the phase distribution, normalized, corresponding to excitation of input ports No. 1 and No. 4. The composite function obtained by a vector addition of the two primary functions are shown in FIG. 5c. The theoretical far field pattern for the field function of FIG. 5c can be produced which indicates that the side lobes are tapered and lower than that for a uniformly illuminated aperture. The beam direction occurs at 14.5° from the normal direction. By adding the output functions for input ports No. 5 and No. 8, a mirror image pattern results; that is, the peak squints at 14.5° on the other side of the normal.

Since the transverse and longitudinal patterns of the array are separable, the composite pattern is the product of the two array patterns. By providing strip radiators 44, designed to squint $\theta$ degrees from the input direction, it is possible to generate four independent beams from the planar array configuration.

Simply, as illustrated in FIG. 4, RF input signal is coupled to a beam switching matrix 46 which is designed to provide a beam signal at either of four equi-power, equi-phase dividers 47, 48, 49, 50. The outputs of the power dividers 47 and 48 are coupled to one eight element Bulter matrix 42, while the outputs of the power dividers 49 and 50 are coupled to the inputs of the Butler matrix 43.

TABLE I

OUTPUT PHASES FOR EACH INPUT PORT

| | | OUTPUT | | | | | | | |
|---|---|---|---|---|---|---|---|---|---|
| | | NO. 1 | NO. 2 | NO. 3 | NO. 4 | NO. 5 | NO. 6 | NO. 7 | NO. 8 |
| INPUT | NO. 1 | 0 | −22.5 | −45 | −67.5 | −90 | −112.5 | −135 | −157.5 |
| | NO. 2 | −90 | +67.5 | 225 | 22.5 | 180 | −22.5 | 135 | −67.5 |
| | NO. 3 | −67.5 | −180 | 67.5 | −45 | −157.5 | 90 | −22.5 | −135 |
| | NO. 4 | −157.5 | −90 | −22.5 | 45 | 112.5 | 180 | −112.5 | −45 |
| | NO. 5 | −45 | −112.5 | −180 | 112.5 | 45 | −22.5 | −90 | −157.5 |
| | NO. 6 | −135 | −22.5 | 90 | 202.5 | 315 | 67.5 | 180 | −67.5 |
| | NO. 7 | −67.5 | −225 | −22.5 | −180 | 22.5 | −135 | −292.5 | −90 |
| | NO. 8 | −157.5 | −135 | −112.5 | −90 | −67.5 | −45 | −22.5 | 0 |

The outputs of the Butler matrices 42 and 43 are coupled to the radiators 44.

STRIP RADIATORS

The configuration concept described herein does not require a specific radiator and a specific type of radiator does not form a part of this invention. The strip radiators can be either Microstrip or strip line. Many of these applicable radiators, as set forth hereinabove, are described in the literature. Three possible types of radiators are described for illustrative purposes.

FIG. 6 illustrates a sandwich wire radiator 51. This radiator 51 as illustrated can be treated as being a series of discrete radiators located at points of maximum displacement from the center line. The phasing of the radiators are related to the ratio of the line length measured along the center line to that measured along the wire.

A printed version of a sandwich wire 51 can be realized by extending the outer grounded conductors back to the reflector to form a cavity. The center conductor can then be printed on a dielectric sheet as illustrated at FIG. 7, which is placed over an open end of the cavity. Many of these arrays can be printed on a single sheet and connected into a Butler matrix feed system, described above, to form a planar array or alternatively, can be shaped to fit the contour of an aircraft.

Figure 8A:
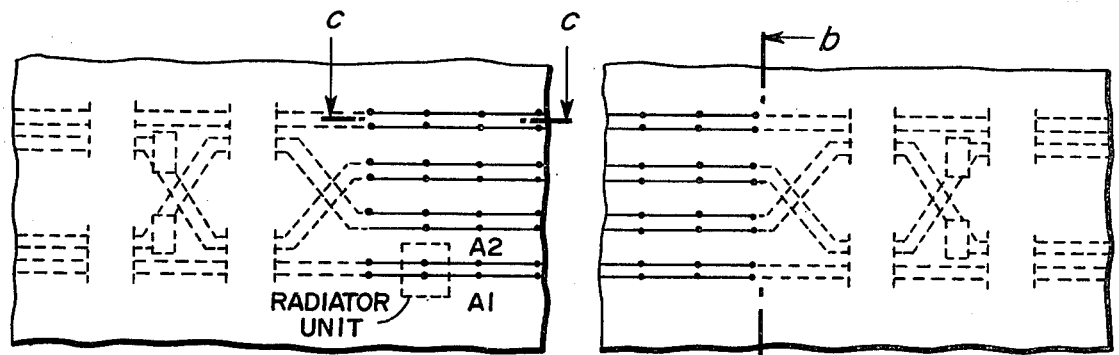
FIG. 8a is an illustration of a Collins radiator suitable for use in accordance with an embodiment of this invention.
Figure 8B:
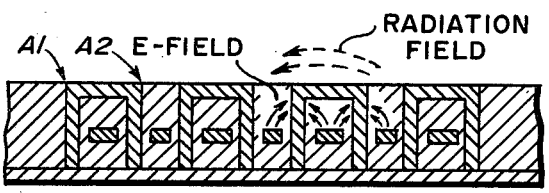
Figure 8C:
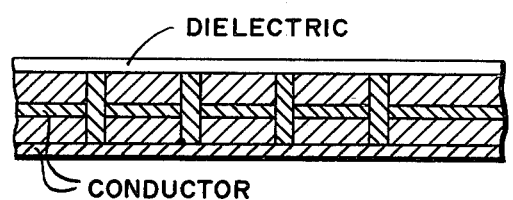

Another suitable radiator is the Collins radiator, described by McDonough in "Recent Developments in the Study of Printed Antennas" as set forth above, as illustrated in FIG. 8. The Collins radiator includes a flat, circular conducting dish, one-half wave length in diameter, mounted parallel to and very closely spaced above a conducting ground plane. The dish is excited from the underside of the ground plane at points A1 and A2 of FIG. 8. The excitation results in a current flow across the dish.

Figure 9A:
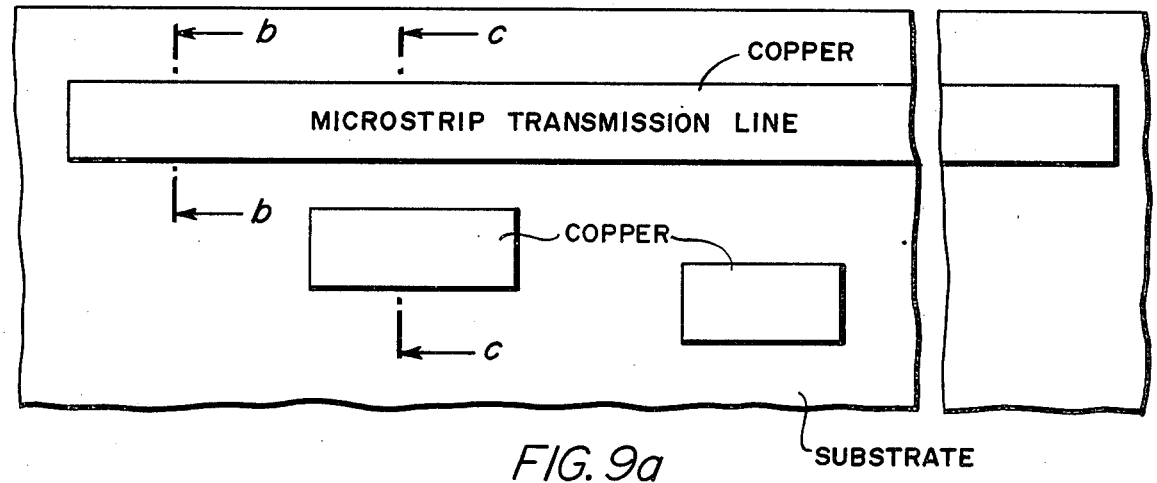
FIG. 9a is an illustration of a microstrip stub radiator suitable for use in accordance with a preferred embodiment of this invention.
Figure 9B:
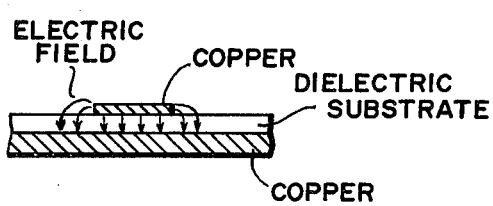
Figure 9C:
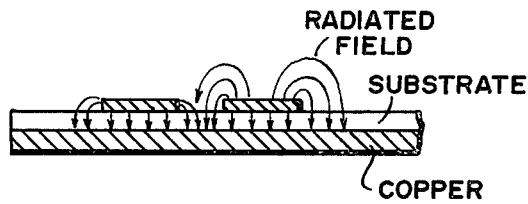

Still another radiator is the open circuit stub radiator, described in "Radiation from Discontinuities in Strip-Line" by L. Lewine, published in the Proceedings of the Institution of Electrical Engineers, Part C, P. 163, September, 1960. As shown in FIG. 9a, a microstrip transmission line is placed parallel to the stub and energy is coupled from the transmission line to the stub. The coupling of energy from one microstrip line to another is described in "Microstrip Plus Equations Adds Up to Fast Design", by A. Schwarzmann, Electronics, Oct. 2, 1967, P. 109. In the above mentioned article, equations for the characteristic impedances of coupled lines are given for both the even-mode forward coupling and for the off-mode reverse coupling of lines. In the forward coupling of lines, the energy in the two coupled line travels in the same direction, whereas in the reverse coupling mode, they travel in opposite direction.

The amount of energy radiated by each open circuit stub can be predicted. In "Radiation Conductance of Open Circuit Microstrip", by H. Sobol, IEEE Transactions, Microwave Theory and Techniques, November 1971, P. 885, the radiation conductance is shown to be $$G = \frac{\left(\epsilon_{R_{eff}}\right)^{3/2}}{180} \left(\frac{w}{\lambda_o}\right)^2$$

where:
$w$ = The width of the microstrip line
$\epsilon R_{eff}$ = The effective permittivity of the substrate and
$\lambda_o$ = The operating wavelength Since the total energy coupled into each stub can be controlled, and the amount of energy radiated can be controlled, the far field radiation pattern for the antenna can likewise be controlled and predicted.

SUMMARY OF PLANAR ARRAY CONFIGURATION

A four beam planar array for printed antennas has been described hereinabove. In order for the configuration to be useful in fixed antenna Doppler application, it should sequentially generate pencil beams with low side lobes and which are squinted symmetrically with respect to the longitudinal and transverse axes of the aircraft. The specification has shown that be using a pair of Butler matrices, feeding strip radiators designed to radiate at a fixed angle with respect to the feed direction, and by appropriate beam combination, all of the foregoing objectives should be met.

The preferred embodiment for the planar configuration of this invention is shown in FIGS. 10a–10d. Energy is channeled from the generator to a microwave switch module, which module determines which of the four ports are to be excited. Each of the four ports are in turn connected to two adjacent input ports of the Butler Feed Matrix in order to provide the cosine taper in the plane orthogonal to the radiating stubs.

The outputs of the Butler Matrices are then connected to the microstrip transmission lines.

The energy traveling along the microstrip transmission lines are then proximity coupled to the radiating stubs. In order to generate the four symmetrically located beams, the radiating stubs are located symmetrically about the center of the array. Thus, regardless of which one of the four ports are excited, the same aperture amplitude distribution results.

Cylindrical Array Configuration

Figure 11:
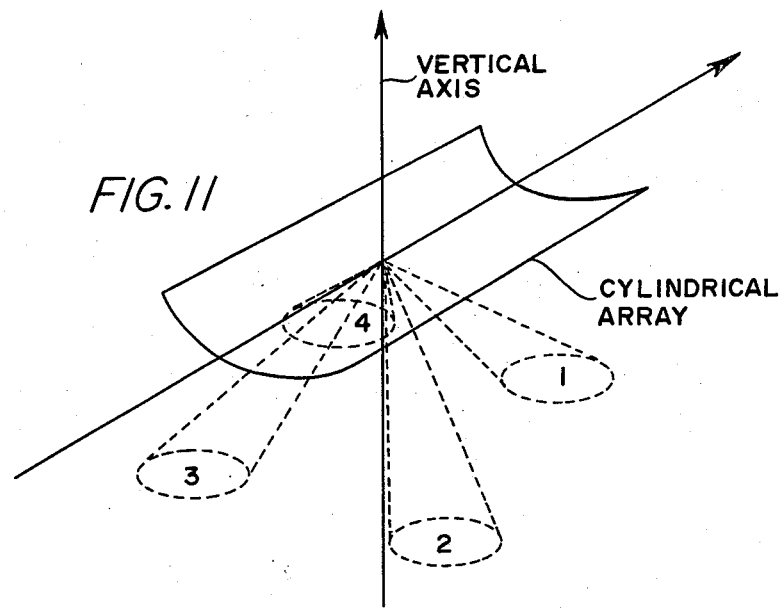
FIG. 11 depicts a spatial relationship for a 4-beam cylindrical array.
Figure 12:
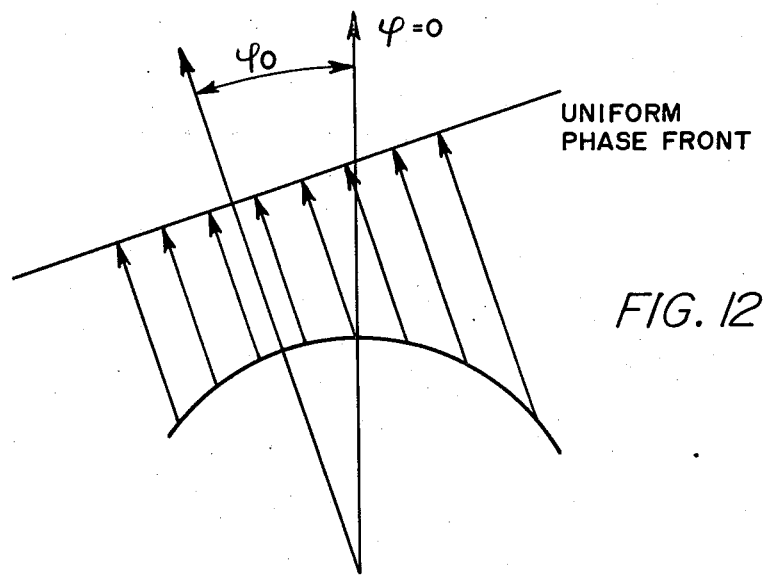
FIG. 12 is a diagram which indicates the path length differences from a ring array.

The following description sets forth a cylindrically shaped printed photo-etched array capable of generating four beams squinted symmetrically about the transverse axis, as indicated at FIG. 11. Because of the circular shape in the cylinder's cross-section it is apparent that the path length from points on the circle to any given phase front are not equal, as indicated at FIG. 12. Many techniques are available for correcting such a phase difference. For example, a shaped dielectric lense can be used to correct path length differences. Alternatively, a series of PIN phase shifters can be used for such correction. Also, it can be shown that a series of Butler feed matrices can be used to excite radiating linear arrays located about the cylinder, as described hereinbelow. The radiating arrays are identical to those described hereinabove in connection with the planar array configuration. To generate the four required symmetrically located beams, all that should be shown is that be feeding one of two inputs from an appropriate feed structure, two beams can be radiated, each scanning the same angle from the center line of the circle. The same feed arrangement connected to the opposite ends of the radiating linear arrays can generate the remaining two of the required four beams.

Phase Correction

Figure 13:
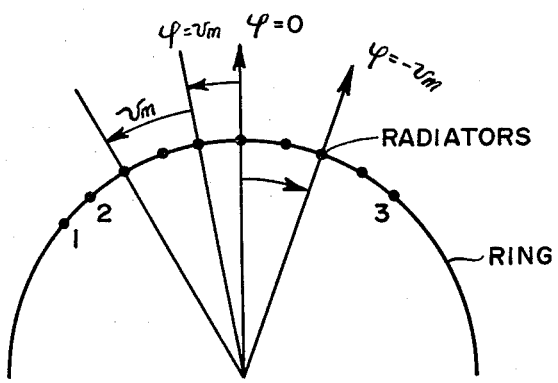
FIG. 13 is a diagram depicting ring array geometry.
Figure 14A:
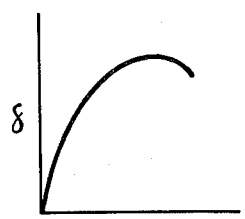
FIGS. 14a, 14b, 14c, 14d, 14e, and 14f are a set of curves which depict the required phase correction of N elements located about an arc for different scan positions.
Figure 14B:
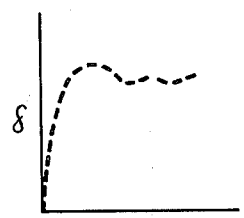
Figure 14C:
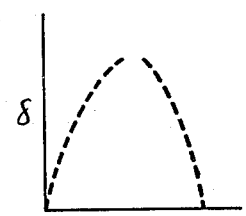
Figure 14D:
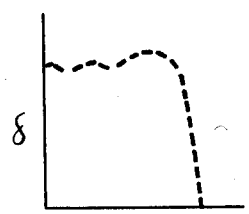
Figure 14E:
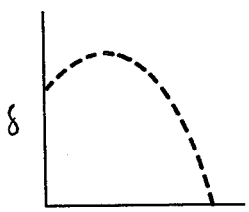
Figure 14F:
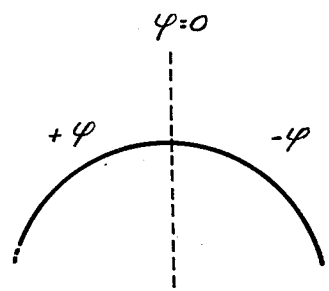

In FIG. 13, the geometry for a ring array is shown. If the center line of the arc is considered to correspond to $\phi=0$, then the phase correction required is related to $$\delta_m = \frac{2\pi R}{\lambda} \cos(\phi_o - \nu_m)$$

where R = the radius of the ring; $\lambda$ = wave length; $\phi_o$ = angle of beam scan; $\nu_m$ = location of Mth radiator.

FIGS. 14a–14f illustrates the phase correction required for a seventy degree arc section, with eight elements at different location angles. It is noted that the phase correction function is not linear, although it is symmetrical for $\pm \phi_o$.

If the phase correction desired for one scan position is generated, say $+\phi_o$, then it can be shown that by using the feed configuration to be given below, the phase correction can be made to be reversed.

FEED MATRIX

As described in the prior art described hereinabove, the basic concepts to scanning a circular array have been discussed. A less vigorous discussion is given hereinbelow. The far field radiation pattern for a linear array is given by $$E(\mu) = \sum_{n=-N}^{N} A_n e^{in\mu} \quad (1)$$

where $$\mu = \frac{2\pi d}{\lambda} \cos \phi$$

The far field radiation pattern for a circular array is given by $$E(\phi) = \sum_{n=-N}^{N} C_n e^{in\phi} \quad (2)$$

Note that in equation (1), there is a linear phase variation across the element function $A_n$. However, because $C_n$ in equation (2) is a complex function and there is no one-to-one correspondence between changes in the current distribution and $C_n$, if the current distribution about the ring were to be represented by a Fourier Series, the terms of such series would each represent a current mode of unit amplitude having a linear phase variation with angle. The far field pattern for each mode has the same form as the mode itself. Thus, it is proper to consider these mode patterns to the terms of a Fourier representation of a far field pattern of the original distribution. It then becomes apparent that by expressing the far field pattern to be the sum of the modes, each having a linear phase variation, the analogy to that of a pattern for a linear array is relevant.

Such modes can be simultaneously and independently excited by using a Butler matrix to feed n elements, as set forth above by Shelton.

Figures 15, 17B, 18A, 18B:
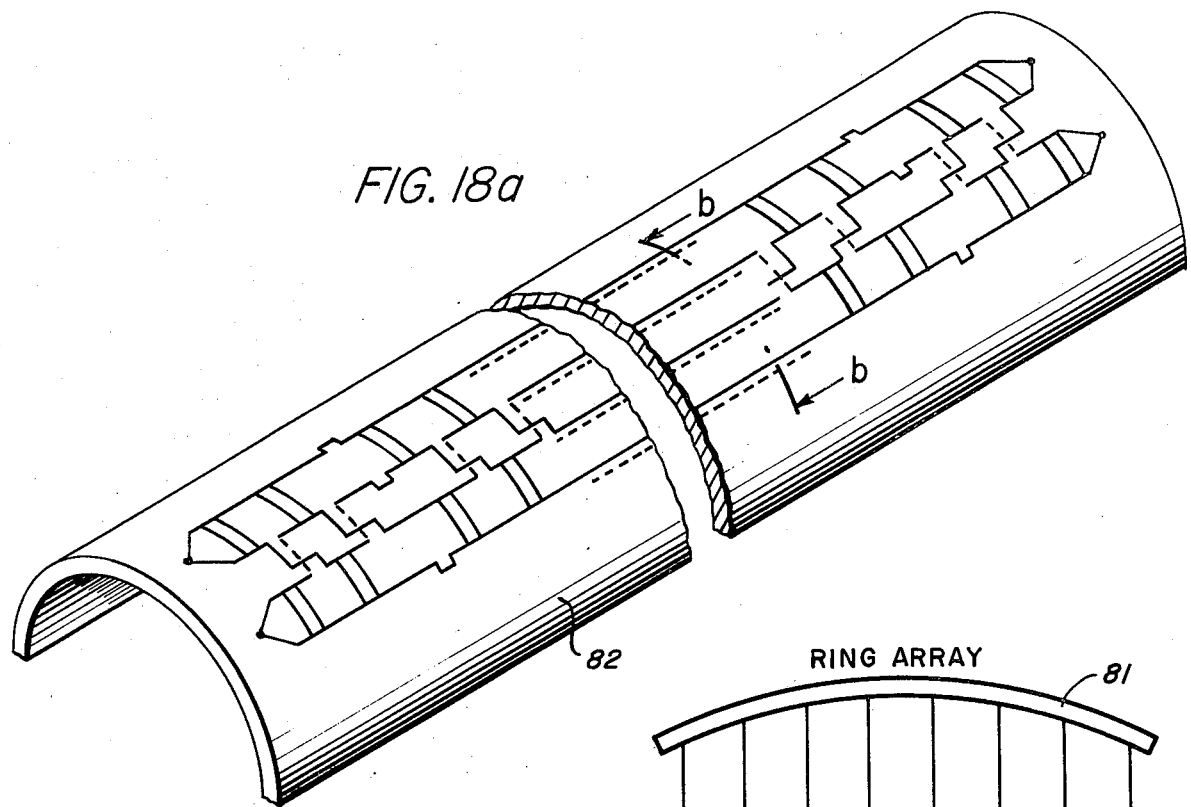
FIG. 15 is a schematic of a multimode ring array.
FIG. 18a is an illustration of the preferred embodiment for the cylindrical array configuration of this invention.
FIG. 18b is a sectional view taken along the line b—b of FIG. 18.

A schematic llustrating the scanning procedure is shown in FIG. 15.

TABLE II

| | | OUTPUTS FROM EXCITATION OF PORT A SIMULTANEOUS OUTPUTS TO (IN DEGREES) | | | | | | | |
|---|---|---|---|---|---|---|---|---|---|
| Phase At Input | From Input | Ele NO. 1 | Ele NO. 2 | NO. 3 | NO. 4 | NO. 5 | NO. 6 | NO. 7 | NO. 8 |
| 78.5° | NO. 1 | 78.75 | 56.25 | 33.75 | 11.25 | −11.25 | −33.75 | −56.25 | −78.75 |
| 370.25° | NO. 2 | 280.25 | 437.75 | 235.25 | 392.75 | 190.25 | 347.75 | 145.25 | 302.75 |
| 564.75° | NO. 3 | 497.25 | 384.75 | 632.25 | 519.75 | 407.25 | 294.75 | 542.25 | 429.75 |
| 649.25° | NO. 4 | 491.75 | 559.25 | 626.25 | 694.25 | 401.75 | 469.25 | 176.75 | 604.25 |

TABLE II-continued

OUTPUTS FROM EXCITATION OF PORT A
SIMULTANEOUS
OUTPUTS TO (IN DEGREES)

| Phase At Input | From Input | Ele NO. 1 | Ele NO. 2 | NO. 3 | NO. 4 | NO. 5 | NO. 6 | NO. 7 | NO. 8 |
|---|---|---|---|---|---|---|---|---|---|
| 626.75° | NO. 5 | 581.75 | 514.25 | 446.75 | 379.25 | 671.75 | 604.25 | 536.75 | 469.25 |
| 497.25° | NO. 6 | 362.25 | 474.75 | 227.25 | 339.75 | 452.25 | 564.75 | 317.25 | 429.75 |
| 257.75° | NO. 7 | 190.25 | 32.75 | 235.25 | 77.75 | 280.25 | 122.75 | 325.25 | 167.75 |
| −78.75° | NO. 8 | −236.25 | −213.75 | −191.25 | −168.75 | −146.25 | −123.75 | −101.25 | −78.75 |

TABLE III

OUTPUTS FROM EXCITATION OF PORT B
SIMULTANEOUS
OUTPUTS TO (IN DEGREES)

| Phase At Input | From Input | Ele NO. 1 | Ele NO. 2 | NO. 3 | NO. 4 | NO. 5 | NO. 6 | NO. 7 | NO. 8 |
|---|---|---|---|---|---|---|---|---|---|
| −78.75° | NO. 1 | −78.75 | −101.25 | −123.75 | −146.25 | −168.75 | −191.25 | −213.75 | −236.25 |
| 257.75° | NO. 2 | 167.75 | 325.25 | 482.75 | 280.25 | 437.75 | 235.25 | 392.75 | 190.25 |
| 497.25° | NO. 3 | 429.75 | 317.25 | 564.75 | 452.25 | 339.75 | 587.25 | 474.75 | 362.25 |
| 626.75° | NO. 4 | 469.25 | 536.75 | 604.25 | 671.75 | 739.25 | 806.75 | 514.25 | 581.75 |
| 649.25° | NO. 5 | 604.25 | 536.75 | 469.25 | 761.75 | 694.25 | 629.75 | 559.25 | 491.75 |
| 564.75° | NO. 6 | 429.75 | 542.25 | 654.75 | 767.25 | 519.75 | 632.25 | 384.75 | 497.25 |
| 370.25° | NO. 7 | 302.75 | 145.25 | 347.75 | 190.25 | 392.75 | 235.25 | 77.75 | 280.25 |
| +78.75° | NO. 8 | −78.75 | −56.25 | −33.75 | −11.25 | 11.25 | 33.75 | 56.25 | 78.75 |

The first Butler matrix 80 is used to scan in the array 81. The second Butler matrix 82 acts as a mode forming matrix. The fixed phase shifters 83–83 are set to focus the beam in one of the scan positions. By alternately exciting the inputs of the first Butler matrix 80, the beam scans.

Figure 16:
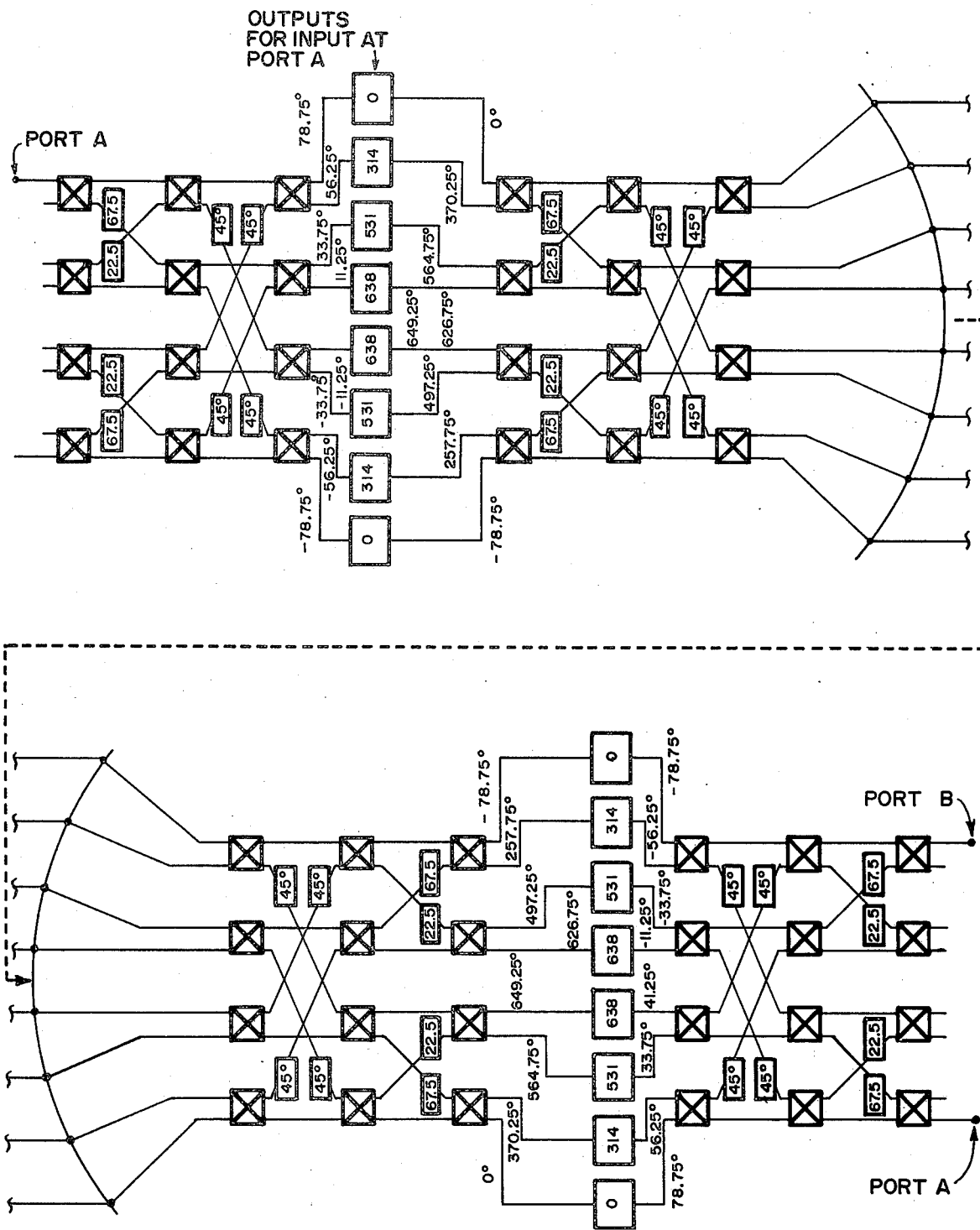
FIG. 16 is a schematic diagram of a multimode cylindrical array in accordance with another embodiment of this invention.
Figure 19A:
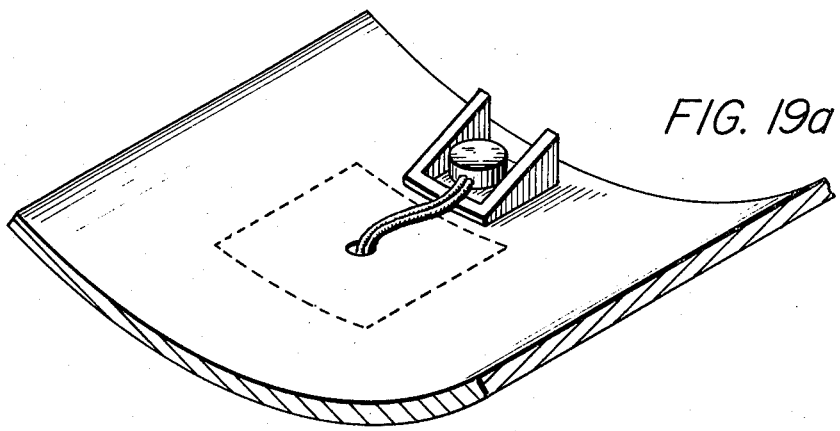
FIGS. 19a, 19b, 19c, 19d, and 19e are a set of views illustrating a mounting arrangement referred to hereinabove.
Figure 19B:
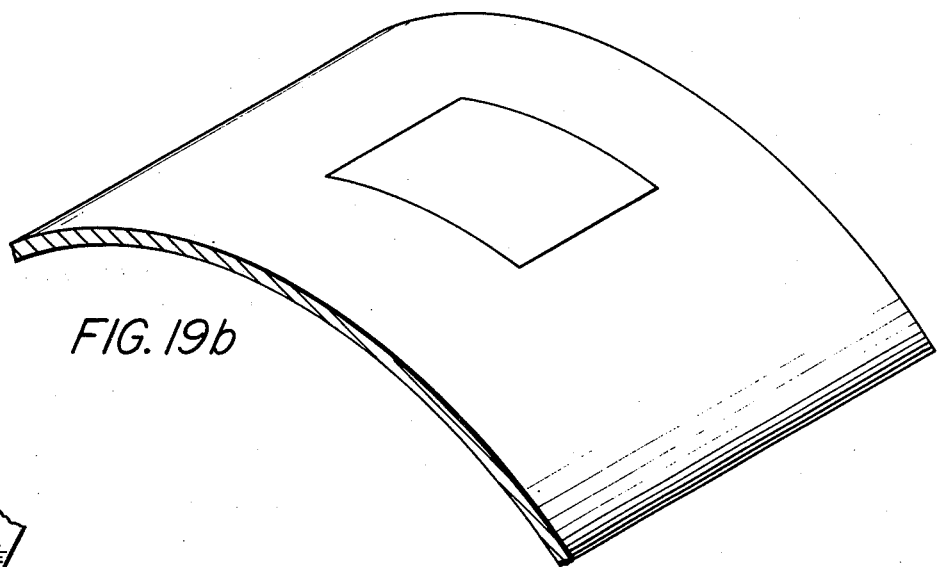
Figure 19D:
Figure 19E:
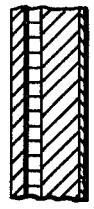
Figure 19C:
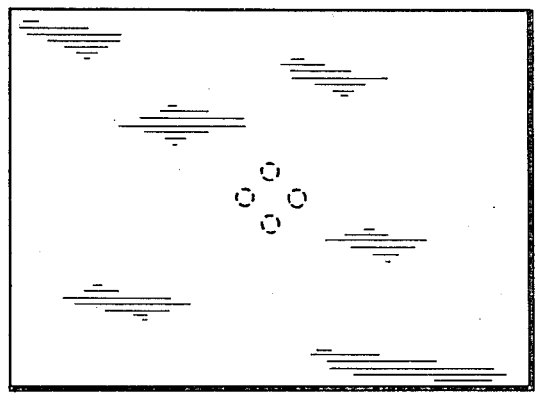

A specific configuration is illustrated at FIG. 16. The phase shifters 83 have been arbitrarily selected as indicated. By exciting port A, the output phase function across the eight elements are mirror images of each other.

Figure 17:
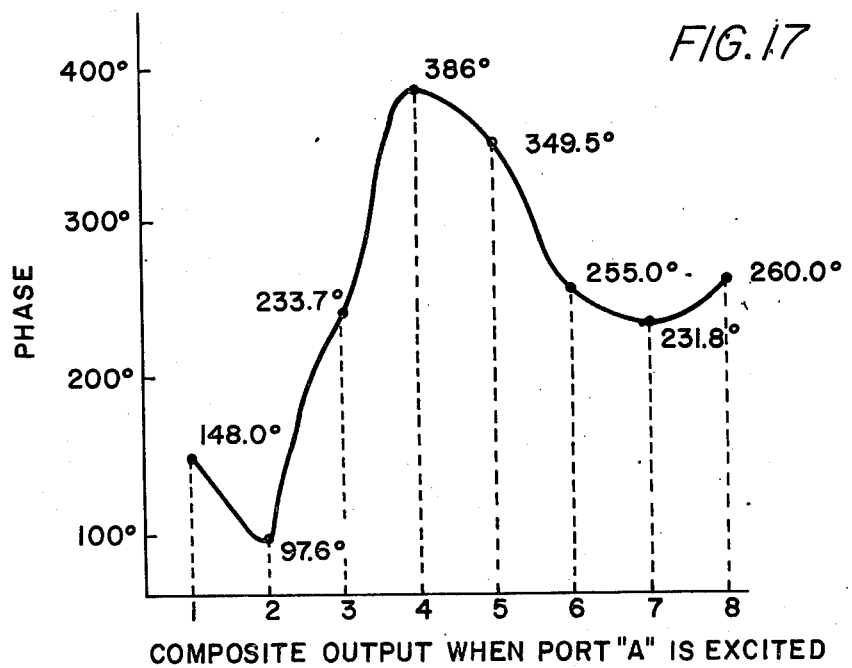
FIGS. 17 and 17b are phase diagrams illustrating the composite output of an antenna having eight radiators.

Table II illustrates the output functions of the second Butler matrix when port A is excited. The different rows represent the outputs due to each of the eight secondary inputs. It is noted that the phases in each of the columns, the modes, vary linearly. The output function obtained by vectorially summing the phases along each of the columns is illustrated at FIG. 17a.

Table III indicates the same information as Table II, when port B is excited. The output function obtained by vectorially summing the phases along each of the columns is illustrated at FIG. 17b. It is noted that the output function is reversed. Thus, had the phase shifters been set correctly, scanning of the pencil beam would have occurred. Because the phases are not perfect, a distorted beam would be scanned. However, for the purposes desired, it is not necessary to show the scanning using the correct phases. Either by analysis or by iteration, the correct phases can always be found. It is thus apparent from FIGS. 14a–14f that had the phase output of the first Butler matrix been correct, the reverse phase on the output would have pointed the beam from + θ degrees to −θ degrees. Thus, by constructing the above structure symmetrically about the center line, four separate but symmetric beams can be obtained.

SUMMARY OF THE CYLINDRICAL ARRAY CONFIGURATION

As indicated in the foregoing, the concept of generating four symmetrical beams from a cylindrical array has been shown.

The approach for generating sequentially four symmetrically located pencil beams from a cylindrical aperture without active phase shifting devices has never previously been achieved, to applicants' knowledge. The novel approach described herein of providing an all printed cylindrical array for Doppler radar application has also never been described, to the best of applicants' knowledge.

The preferred embodiment for the cylindrical configuration of this invention is shown in FIGS. 18a and 18b. As shown, the energy from the generator is fed into a microwave switch module and sequentially distributed to one of the four input ports shown. Each of the input ports is in turn coupled to two adjacent input ports of a feed Butler Matrix, in a manner identical to that described for the preferred embodiment of the planar array configuration. The output of the feed matrix, however, is connected to a row of fixed phase delay lines (phase shifters) which in turn are connected to a second Butler Matrix, the mode matrix. The outputs of the Mode Matrix are then connected to microstrip transmission lines. The short radiating stubs shown are then placed parallel to the transmission lines in a manner similar to that described for the planar array configuration.

Again, the stubs are located symmetrically about the centerline orthogonal to the transmission lines. Thus, in a manner identical to that for the planar array configuration, four symmetrical beams result.

As indicated hereinabove, there have been shown novel printed antennas for generating symmetrically located beams including a pair of Butler matrices and a plurality of strip radiators coupled to the matrices. Such combinations are suitable both for planar and cylindrical arrays and other conformal shapes. Other configurations will suggest themselves to those skilled in the art.

What is claimed is:

1. A cylindrically shaped printed airborne doppler radar antenna array for generating up to four beams symmetrical about its transverse axis comprising:
   a. a plurality of strip radiators symmetrically disposed about a cylindrical locus;

b. a first Butler matrix having inputs adapted to be coupled to suitable radar circuitry for scanning said strip radiators;

c. a first plurality of printed phase shifters coupled to outputs of said first Butler matrix for focusing a beam in one of a plurality of scan positions;

d. a second Butler matrix having its inputs coupled to said printed phase shifters and having its output coupled to one end of said plurality of strip radiators for acting as a mode generating matrix;

e. a third Butler matrix having inputs adapted to be coupled to said radar circuitry for scanning said strip radiators;

f. a second plurality of printed fixed phase shifters coupled to outputs of said third Butler matrix for focusing a beam in one of a plurality of scan positions; and g. a fourth Butler matrix having its inputs coupled to said second plurality of printed fixed phase shifters and having its output coupled to the other end of said radiators for acting as a mode generating matrix, both said first and third Butler matrices having at least two inputs, whereby by selectively exciting the four inputs thereby provided, any one of four beams symmetrically disposed about the transverse axis of said antenna can be generated.

2. The invention as recited in claim 1 wherein the antenna is adapted to be mounted on the outside surface of an aircraft.

3. The antenna as recited in claim 1 further comprising a planar substrate, and wherein said Butler matrices and said strip radiators are affixed to said planar substrate.

4. The antenna as recited in claim 1 wherein a plurality of pencil beams are generated, said beams being symmetrically located about a centerline orthogonal to the said strip radiators.

5. The antenna as recited in claim 1 wherein said radiators are traveling wave arrays.

6. The antenna as recited in claim 1 wherein said strip radiators and Butler matrices and phase shifters are photoetched in manner commonly known as Microstrip lines.

7. The antenna as recited in claim 1 wherein said strip radiators, Butler matrices and phase shifters are photoetched in manner commonly known as Stripline.

8. The antenna as recited in claim 1 wherein said strip radiators, Butler matrices and phase shifters are photoetched and constructed partly in the manner known as stripline and partly in the manner known as Microstrips.

* * * * *